United States Patent
Ren et al.

(10) Patent No.: US 12,238,676 B2
(45) Date of Patent: *Feb. 25, 2025

(54) METHODS AND APPARATUSES FOR LOCATION REPORTING

(71) Applicant: Telefonaktiebolaget LM Ericsson (publ), Stockholm (SE)

(72) Inventors: Gang Ren, Shanghai (CN); Nianshan Shi, Järfälla (SE); Chaopeng Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

This patent is subject to a terminal disclaimer.

(21) Appl. No.: 18/069,236

(22) Filed: Dec. 21, 2022

(65) Prior Publication Data

US 2023/0120457 A1     Apr. 20, 2023

Related U.S. Application Data

(63) Continuation of application No. 17/281,231, filed as application No. PCT/CN2019/105433 on Sep. 11, 2019, now Pat. No. 11,540,247.

(30) Foreign Application Priority Data

Sep. 30, 2018  (WO) ............................... 2018109158

(51) Int. Cl.
*H04W 64/00* (2009.01)
*H04W 4/02* (2018.01)
(Continued)

(52) U.S. Cl.
CPC ......... *H04W 64/003* (2013.01); *H04W 4/021* (2013.01); *H04W 4/025* (2013.01);
(Continued)

(58) Field of Classification Search
CPC ....... H04W 4/025; H04W 76/10; H04W 8/02; H04W 4/021; H04W 4/029;
(Continued)

(56) References Cited

U.S. PATENT DOCUMENTS 11,405,854 B2 * 8/2022 Ronneke et al. ..... H04W 48/06
11,540,247 B2 * 12/2022 Ren et al. ........... H04W 64/003
(Continued)

FOREIGN PATENT DOCUMENTS

| CN | 1589581 A | 3/2005 |
| CN | 101800973 A | 8/2010 |

(Continued)

OTHER PUBLICATIONS

Liu, He-lun (CN 110167080 A) >>> Method and Device Subscription Information Update (see title) (Year: 2019).*
(Continued)

*Primary Examiner* — Meless N Zewdu
(74) *Attorney, Agent, or Firm* — Nicholson De Vos Webster & Elliott LLP (57) ABSTRACT

Methods and apparatuses are disclosed for location reporting. A mobility management node determines to establish a connection between the mobility management node and a terminal device for which location reporting is required. The mobility management node sends, to a base station, a request for establishing the connection. The request is configured to request the base station to report location information of the terminal device.

11 Claims, 3 Drawing Sheets

(51) Int. Cl.
    *H04W 4/021*      (2018.01)
    *H04W 4/029*      (2018.01)
    *H04W 8/02*       (2009.01)
    *H04W 76/10*      (2018.01)

(52) U.S. Cl.
    CPC ............. *H04W 4/029* (2018.02); *H04W 8/02*
                    (2013.01); *H04W 76/10* (2018.02)

(58) Field of Classification Search
    CPC ..... H04W 64/003; H04W 4/02; H04W 64/00;
             H04W 24/10; H04W 36/0055; H04W
             36/0058; H04W 76/00; H04W 76/11;
             H04W 76/20; H04W 76/16; H04W 76/27;
             H04W 88/00; H04W 88/02; H04W 88/08;
             H04W 88/005; H04W 92/14; H04W
             92/12; H04W 92/10; H04W 8/08; H04W
             8/20; H04W 8/24; H04W 8/18; H04W
             80/08; G06F 16/387; G06F 16/487; G06F
             16/587; G06F 16/687; G06F 16/787;
             G06F 16/24575; H04L 9/0872; H04L
             12/1845; H04L 67/52; H04L 51/222;
             H04B 17/253; H04B 7/18556
    See application file for complete search history.

(56) References Cited

U.S. PATENT DOCUMENTS

| | | | | |
|---|---|---|---|---|
| 2010/0261473 | A1* | 10/2010 | Al-Bakri et al. | ........... 455/435.2 |
| 2011/0098048 | A1* | 4/2011 | Zhang et al. | ................. 455/438 |
| 2011/0223919 | A1* | 9/2011 | Vikberg et al. | ............... 455/436 |
| 2013/0344894 | A1 | 12/2013 | De et al. | |
| 2014/0274136 | A1* | 9/2014 | Edge et al. | ............. H04W 4/04 |
| 2015/0365789 | A1* | 12/2015 | Salot et al. | ............. H04W 4/02 |
| 2018/0199160 | A1* | 7/2018 | Edge | ..................... H04W 4/029 |
| 2018/0227699 | A1* | 8/2018 | Kim et al. | .............. H04W 4/02 |
| 2018/0227842 | A1 | 8/2018 | Chandramouli et al. | |
| 2018/0376302 | A1* | 12/2018 | Pancorbo Marcos et al. ............. H04W 4/24 | |
| 2019/0053010 | A1* | 2/2019 | Edge et al. | ........... H04W 4/029 |
| 2020/0305211 | A1* | 9/2020 | Foti et al. | ............. H04W 76/16 |
| 2021/0112129 | A1 | 4/2021 | Helun | |

FOREIGN PATENT DOCUMENTS

| | | | | |
|---|---|---|---|---|
| CN | 104823511 | A | 8/2015 | |
| CN | 105025465 | A | 11/2015 | |
| CN | 106507348 | A | 3/2017 | |
| CN | 107254604 | A | 10/2017 | |
| CN | 108307429 | A | 7/2018 | |
| CN | 110167080 | A | 8/2019 | |
| KR | 10-2015-0035288 | A | 4/2015 | |
| WO | 2012/146115 | A1 | 11/2012 | |
| WO | WO 2014084766 | A1 * | 6/2014 | ............ H04W 74/00 |
| WO | 2014/201697 | A1 | 12/2014 | |
| WO | 2015/161575 | A1 | 10/2015 | |
| WO | WO-2017080997 | A1 * | 5/2017 | ............. H04L 12/14 |
| WO | 2017/140204 | A1 | 8/2017 | |
| WO | 2018/174638 | A1 | 9/2018 | |
| WO | 2019/010633 | A1 | 1/2019 | |

OTHER PUBLICATIONS

Miao et al. (WO 2014201697 A1) >>> Method and Device for Establishing RRC Connection (see title) (Year: 2014).*
He et al. (WO 2019010633 A1) >>> Method and Device for Establishing Connection (see title) (Year: 2019).*
Deluca et al. (CN 1589581 A) >>> Method of Determining Location Information Receiver (see title) (Year: 2005).*
KR 20150035288 A) >>> A Smart Device With Sevice Application Based on POI Funtion or It Method (see title) (Year: 2015).*
WO 2015161575 A1) >>> Method, Base Station, Mobile Management Entity, and System for Reporting Location of User Terminal (see title) (Year: 2015).*
Office Action, CN App. No. 201980064058.3, Jul. 30, 2024, 15 pages (7 pages of English translation and 8 pages of Original Document).
LG Electronics Inc., "(TP for NR BL CR for TS 38.413): Further discussions on RRC inactive transition report", Aug. 20-24, 2018, 4 pages, 3GPP TSG-RAN WG3 #101, R3-185068, Gothenburg, Sweden.
Office Action, CN App. No. 201980064058.3, Nov. 27, 2023, 15 pages of Original Document Only.
3GPP TS 36.300 V12.10.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Jun. 2016, 254 pages, 3GPP Organizational Partners.
3GPP TS 38.413 V15.1.0, "3rd Generation Partnership Project; Technical Specification Group Radio Access Network; NG-RAN; NG Application Protocol (NGAP) (Release 15)," Sep. 2018, 295 pages, 3GPP Organizational Partners.
Ericsson, "RRC Inactive state notification support in TS 23.502," Aug. 21-25, 2017, 6 pages, SA WG2 Meeting #122bis, S2-175390, Sofia Antipolis, France.
Examination Report for India Application No. 282/2019/1988, dated Mar. 16, 2021, 1 page.
Examination Report, IN App. No. 202147019058, Feb. 22, 2022, 5 pages.
Huawei, "Location Report in Initial Context Setup", Aug. 18-22, 2008, 5 pages, 3GPP TSG-RAN WG3 Meeting #61, R3-081899, Jeju Island, Korea.
International Preliminary Report on Patentability, PCT App. No. PCT/CN2019/105433, Apr. 8, 2021, 05 pages.
International Search Report and Written Opinion for Application No. PCT/CN2019/105433, dated Nov. 29, 2019, 8 pages.
Non-Final Office Action, U.S. Appl. No. 17/281,231, filed Apr. 8, 2022, 10 pages.
Notice of Allowance, U.S. Appl. No. 17/281,231, filed Aug. 23, 2022, 10 pages.
Qualcomm Incorporated, "TS 23.501: Essential Corrections to Registration and Connection Management", SA WG2 Meeting #S2-123, S2-177853, Oct. 23-27, 2017, 13 pages.
Supplementary European Search Report, EP App. No. 19866438.5, Jun. 1, 2022, 10 pages.
Communication under Rule 71(3) EPC, EP App. No. 19866438.5, Nov. 14, 2024, 6 pages.
Notice to Grant, CN App. No. 201980064058.3, Nov. 12, 2024, 6 pages (2 pages of English translation and 4 pages of Original Document).

* cited by examiner

METHODS AND APPARATUSES FOR LOCATION REPORTING

CROSS-REFERENCE TO RELATED APPLICATIONS

This application is a continuation of application Ser. No. 17/281,231, filed Mar. 29, 2021, which is a National stage of International Application No. PCT/CN2019/105433, filed Sep. 11, 2019, which claims priority to International Application No. PCT/CN2018/109158, filed Sep. 30, 2018, which are all hereby incorporated by reference.

TECHNICAL FIELD

Embodiments of the disclosure generally relate to communication, and, more particularly, to methods and apparatuses for location reporting.

BACKGROUND

This section introduces aspects that may facilitate better understanding of the present disclosure. Accordingly, the statements of this section are to be read in this light and are not to be understood as admissions about what is in the prior art or what is not in the prior art.

Next generation (NG)-radio access network (RAN) supports NG-RAN location reporting for the services that require accurate cell identification (e.g. emergency services, lawful intercept, charging) or for a UE mobility event notification service subscribed to an access and mobility management function (AMF) by other network functions (NFs). The NG-RAN location reporting may be used by the AMF when a target user equipment (UE) is in connection management (CM)-CONNECTED state.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for location reporting.

According to a first aspect of the disclosure, there is provided a method implemented at a mobility management node. The method may comprise determining to establish a connection between the mobility management node and a terminal device for which location reporting is required. The method may further comprise sending, to a base station, a request for establishing the connection. The request may be configured to request the base station to report location information of the terminal device.

In an embodiment of the disclosure, the determining to establish a connection may comprise determining the terminal device is to transit from connection management idle (CM-IDLE) state to CM-CONNECTED state.

In an embodiment of the disclosure, the request for establishing a connection may be a request for establishing a context for the terminal device.

In an embodiment of the disclosure, the request may be configured to request the base station to report location information of the terminal device by including an information element (IE) for requesting location reporting.

In an embodiment of the disclosure, the request for establishing a connection may be an INITIAL CONTEXT SETUP REQUEST message or a DOWNLINK non-access stratum (NAS) TRANSPORT message. The IE for requesting location reporting may be a Location Reporting Request Type IE that indicates a type of the requested location reporting.

In an embodiment of the disclosure, the type of the requested location reporting may be one of the following: to report terminal device moving into an area of interest; to report terminal device moving out of an area of interest; or to report the location of terminal device.

According to a second aspect of the disclosure, there is provided a method implemented at a base station. The method may comprise receiving, from a mobility management node, a request for establishing a connection between the mobility management node and a terminal device. The request may be configured to request the base station to report location information of the terminal device. The method may further comprise reporting, according to the request, the location information of the terminal device to the mobility management node.

In an embodiment of the disclosure, the received request for establishing a connection may accompany a transition of the terminal device from CM-IDLE state to CM-CONNECTED state.

In an embodiment of the disclosure, the request for establishing a connection may be a request for establishing a context for the terminal device.

In an embodiment of the disclosure, the request may be configured to request the base station to report location information of the terminal device by including an IE for requesting location reporting.

In an embodiment of the disclosure, the request for establishing a connection may be an INITIAL CONTEXT SETUP REQUEST message or a DOWNLINK NAS TRANSPORT message. The IE for requesting location reporting may be a Location Reporting Request Type IE that indicates a type of the requested location reporting. The location information of the terminal device may be reported to the mobility management node according to the indicated type.

According to a third aspect of the disclosure, there is provided a mobility management node. The mobility management node may comprise at least one processor and at least one memory. The at least one memory may contain instructions executable by the at least one processor, whereby the mobility management node may be operative to determine to establish a connection between the mobility management node and a terminal device for which location reporting is required. The mobility management node may be further operative to send, to a base station, a request for establishing the connection. The request may be configured to request the base station to report location information of the terminal device.

In an embodiment of the disclosure, the mobility management node may be operative to perform the method according to the above first aspect.

According to a fourth aspect of the disclosure, there is provided a base station. The base station may comprise at least one processor and at least one memory. The at least one memory may contain instructions executable by the at least one processor, whereby the base station may be operative to receive, from a mobility management node, a request for establishing a connection between the mobility management node and a terminal device. The request may be configured to request the base station to report location information of the terminal device. The base station may be further operative to report, according to the request, the location information of the terminal device to the mobility management node.

In an embodiment of the disclosure, the base station may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a mobility management node. The mobility management node may comprise a determination module for determining to establish a connection between the mobility management node and a terminal device for which location reporting is required. The mobility management node may further comprise a sending module for sending, to a base station, a request for establishing the connection. The request is configured to request the base station to report location information of the terminal device.

According to an eighth aspect of the disclosure, there is provided a base station. The base station may comprise a reception module for receiving, from a mobility management node, a request for establishing a connection between the mobility management node and a terminal device. The request is configured to request the base station to report location information of the terminal device. The base station may further comprise a location reporting module for reporting, according to the request, the location information of the terminal device to the mobility management node.

According to some embodiment(s) of the disclosure, the signaling between the mobility management node and the base station can be reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

A session management function (SMF) may subscribe to the UE mobility event notification from an AMF, such as reporting the UE location, UE moving into or out of area of interest (AOI), or the like, by invoking Namf_EventExposure_Subscribe service operation. After the subscription, a location reporting procedure may be performed by the AMF.

The AMF may request the NG-RAN location reporting with event reporting type (e.g. UE location or UE presence in AOI), reporting mode and its related parameters (e.g. number of reporting).

As previously mentioned, when a UE is in CM-CONNECTED state, NG-RAN location reporting procedure may be performed. Location information of the UE is reported by the NG-RAN to the AMF then to the SMF. When the UE transits to CM-IDLE state, the NG-RAN location reporting procedure ceases. Later on, when the UE wants to change the state from CM-IDLE to CM-CONNECTED and with event subscription existing (e.g. AOI), NG-RAN location reporting procedure won't automatically restart. To accompany the UE transiting from CM-IDLE state to CM-CONNECTED state, a message for establishing a connection between the AMF and the UE, such as setting up a UE-context which can be called an Initial Context Setup Message, is sent from the AMF to the NG-RAN. However, there is no indication of instruction on location report, e.g. Location Reporting Request Type information element (IE) included in the Initial Context Setup or Downlink NAS Transport message. Besides a previous request for NG-RAN location reporting procedure when the UE previously transited to its CM-CONNECTED state, the AMF has to re-request the NG-RAN location reporting explicitly, with a separate Location Reporting procedure.

The present disclosure proposes improved solutions for location reporting. These solutions may be applied to a wireless communication system including a terminal device, a base station and a mobility management node. The terminal device can communicate through a radio access communication link with the base station. The base station can provide radio access communication links to terminal devices that are within its communication service cell. The base station may be, for example, a gNB in new radio (NR) or an evolved node B (eNB) in LTE. Note that the communications may be performed between the terminal device and the base station according to any suitable communication standards and protocols. The mobility management node can carry out the mobility management of the terminal device. For example, the mobility management node may be an AMF in NR or an MME in LTE.

The terminal device may also be referred to as, for example, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 1:
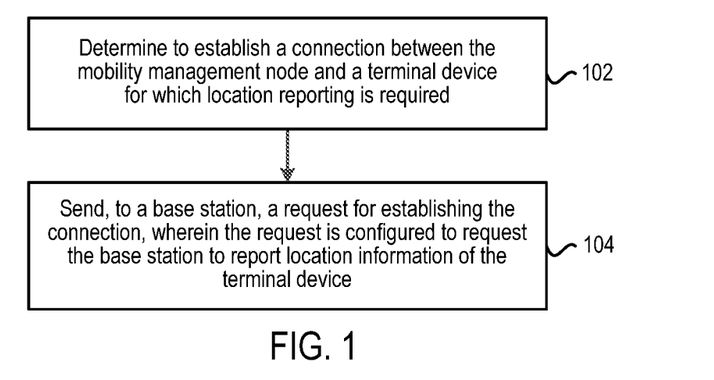
FIG. 1 is a flowchart illustrating a method implemented at a mobility management node according to an embodiment of the disclosure.

Hereinafter, the solutions will be described in detail with reference to FIGS. 1-6. FIG. 1 is a flowchart illustrating a method implemented at a mobility management node according to an embodiment of the disclosure. For example, the mobility management node may take the form of an AMF, an MME, or any other entity having similar functionality. At block 102, the mobility management node determines to establish a connection between the mobility management node and a terminal device for which location reporting is required. For example, in the case of NR (which means the mobility management node is an AMF), if a terminal device is performing registration update procedure or service request procedure, or if the AMF is performing service request procedure for the terminal device (which means the terminal device is transiting from CM_IDLE to CM_CONNECTED), the AMF may determine to establish a connection between the AMF and the terminal device. If an NF, such as an SMF, a network exposure function (NEF), or the like, has subscribed to mobility event notification from the AMF for the terminal device, the AMF may determine that location reporting is required for the terminal device.

At block 104, the mobility management node sends, to a base station, a request for establishing the connection. The request is configured to request the base station to report location information of the terminal device. Since the request for establishing the connection also request the base station to report location information of the terminal device, the signaling between the mobility management node and the base station can be reduced. In the case of NR, if there is any downlink data destined to the terminal device, the service delay can be reduced since the indication about the location of the terminal device (e.g. the terminal device moving into AOI) can be timely provided from the AMF to the SMF. For example, the request for establishing the connection may be a request for establishing a context for the terminal device. In order to request the base station to report location information of the terminal device, the request for establishing the connection may include an IE for requesting location reporting.

As an exemplary example, the request for establishing the connection may be an INITIAL CONTEXT SETUP REQUEST message (in the case of registration update procedure or service request procedure) or a DOWNLINK NAS TRANSPORT message (in the case of registration update procedure). The IE for requesting location reporting may be an IE called Location Reporting Request Type that indicates a type of the requested location reporting, such as UE location, UE moving into or out of AOI, or the like. The location Reporting Request is included in the message that is first sent from 5th generation core (5GC) to NG-RAN node when the terminal device transits from CM-IDLE to CM-CONNECTED. As an example, the message first sent from 5GC to NG-RAN is an Initial Context Setup message requesting for an establishment of a connection. In this way, the NG-RAN location reporting procedure can be optimized.

For example, the INITIAL CONTEXT SETUP REQUEST message defined in chapter 9.2.2.1 of 3GPP technical specification (TS) 38.413 v15.1.0 may be modified with the enhancement introduced in the last row of the below Table 1, which is underlined for ease of reading. The DOWNLINK NAS TRANSPORT message defined in chapter 9.2.5.2 of 3GPP TS 38.413 v15.1.0 may be modified with the enhancement introduced in the last row of the below Table 2, which is also underlined for ease of reading. It should be noted that although the method has been described above in the context of NR, those skilled in the art can understand that the same principle can also be applied to other suitable technologies such as LTE (e.g. an MME may send, to an eNB, an INITIAL CONTEXT SETUP REQUEST message including Location Reporting Request Type IE).

TABLE 1

Enhanced INITIAL CONTEXT SETUP REQUEST by adding Location Reporting Request Type

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.22 | | YES | reject |
| UE Aggregate Maximum Bit Rate | C-ifPDUsessionResourceSetup | | 9.3.1.58 | | YES | reject |
| RRC Inactive Assistance Information | O | | 9.3.1.15 | | YES | ignore |
| GUAMI | M | | 9.3.3.3 | | YES | reject |
| PDU Session Resource Setup Request List | | 0 . . . 1 | | | YES | reject |
| >PDU Session Resource Setup Request Item IEs | | 1 . . . <maxnoofPDUSessions> | | | EACH | reject |

TABLE 1-continued

Enhanced INITIAL CONTEXT SETUP REQUEST by adding Location Reporting Request Type

| IE/Group Name | Presence | Range | IE type and reference | Semantics description | Criticality | Assigned Criticality |
|---|---|---|---|---|---|---|
| >>PDU Session ID | M | | 9.3.1.50 | | — | |
| >>NAS-PDU | O | | 9.3.3.4 | | — | |
| >>S-NSSAI | M | | 9.3.1.24 | | — | |
| >>PDU Session Resource Setup Request Transfer | M | | OCTET STRING | Containing the PDU Session Resource Setup Request Transfer IE specified in subclause 9.3.4.1. | — | |
| Allowed NSSAI | M | | 9.3.1.31 | Indicates the S-NSSAIs permitted by the network | YES | ignore |
| UE Security Capabilities | M | | 9.3.1.86 | | YES | reject |
| Security Key | M | | 9.3.1.87 | | YES | reject |
| Trace Activation | O | | 9.3.1.14 | | YES | ignore |
| Mobility Restriction List | O | | 9.3.1.85 | | YES | ignore |
| UE Radio Capability | O | | 9.3.1.74 | | YES | ignore |
| Index to RAT/Frequency Selection Priority | O | | 9.3.1.61 | | YES | ignore |
| Masked IMEISV | O | | 9.3.1.54 | | YES | ignore |
| NAS-PDU | O | | 9.3.3.4 | | YES | ignore |
| Emergency Fallback Indicator | O | | 9.3.1.26 | | YES | reject |
| Location Reporting Request Type | O | | 9.3.1.65 | | YES | ignore |

TABLE 2

Enhanced DOWNLINK NAS TRANSPORT by adding Location Reporting Request Type

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| Old AMF | O | | AMF Name 9.3.3.22 | | YES | reject |
| RAN Paging Priority | O | | 9.3.3.15 | | YES | ignore |
| NAS-PDU | M | | 9.3.3.4 | | YES | reject |
| Mobility Restriction List | O | | 9.3.1.85 | | YES | ignore |
| Index to RAT/Frequency Selection Priority | O | | 9.3.1.61 | | YES | ignore |
| UE Aggregate Maximum Bit Rate | O | | 9.3.1.58 | | YES | ignore |
| Location Reporting Request Type | O | | 9.3.1.65 | | YES | ignore |

Figure 2:
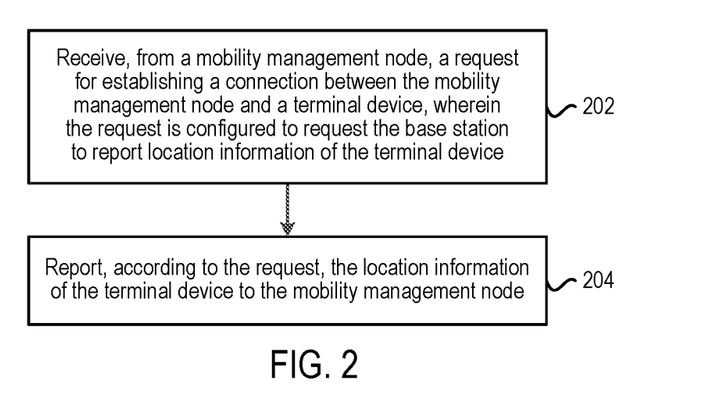
FIG. 2 is a flowchart illustrating a method implemented at a base station according to an embodiment of the disclosure.

FIG. 2 is a flowchart illustrating a method implemented at a base station according to an embodiment of the disclosure. At block 202, the base station receives, from a mobility management node, a request for establishing a connection between the mobility management node and a terminal device. The request is configured to request the base station to report location information of the terminal device. As mentioned above, the received request for establishing a connection may accompany a transition of the terminal device from CM-IDLE state to CM-CONNECTED state. Block 202 corresponds to block 104 and its details are omitted here. At block 204, the base station reports, according to the request, the location information of the terminal device to the mobility management node. For example, in the case of NR, the request for establishing the connection may be an INITIAL CONTEXT SETUP REQUEST message or a DOWNLINK NAS TRANSPORT message. The IE for requesting location reporting may be an IE called Location Reporting Request Type that indicates a type of the requested location reporting. The location information of the terminal device is reported to the mobility management node according to the indicated type. If the Location Reporting Request Type IE is included in the INITIAL CONTEXT SETUP REQUEST message or the DOWNLINK NAS TRANSPORT message, the base station may perform the requested location reporting functionality for the terminal device as described in subclause 8.12 of 3GPP TS 38.413 v15.1.0. It should be noted that two blocks shown in succession in the figures may, in fact, be executed substantially concurrently, or the blocks may sometimes be executed in the reverse order, depending upon the functionality involved.

Figure 3:
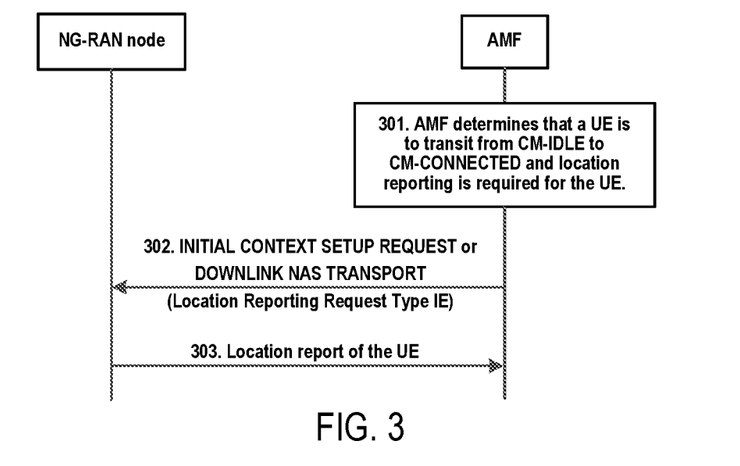
FIG. 3 is a flowchart illustrating an exemplary process according to an embodiment of the disclosure.

FIG. 3 is a flowchart illustrating an exemplary process according to an embodiment of the disclosure. As shown, in this exemplary process, the mobility management node is an AMF and the base station is an NG-RAN node. At block 301, the AMF determines that a UE is to transit from CM-IDLE state to CM-CONNECTED state and location reporting is required for the UE. At block 302, the AMF sends, to the NG-RAN node, an INITIAL CONTEXT SETUP REQUEST or DOWNLINK NAS TRANSPORT message, which is enhanced by including a Location Reporting Request Type IE indicating the type of the requested location reporting. At block 303, according to the indicated type of the requested location reporting, the NG-RAN node send location report(s) of the UE to the AMF.

Figure 4:
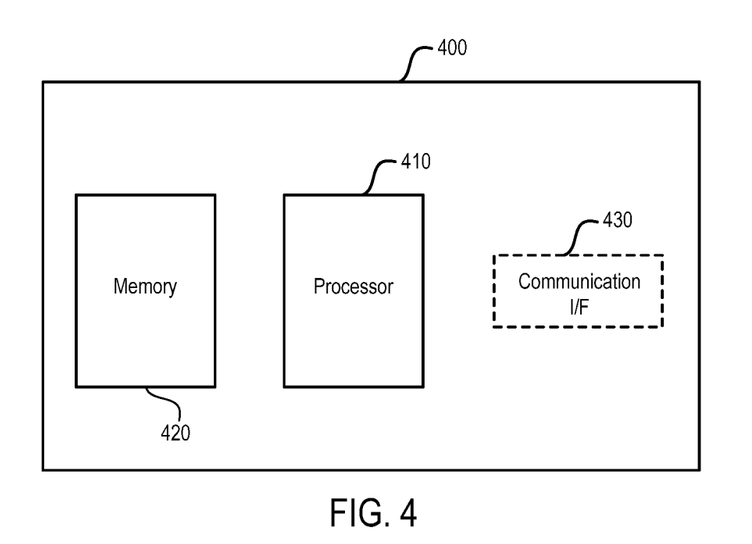
FIG. 4 is a block diagram showing an apparatus suitable for use in practicing some embodiments of the disclosure.

FIG. 4 is a block diagram showing an apparatus suitable for use in practicing some embodiments of the disclosure. For example, any one of the mobility management node and the base station described above may be implemented through the apparatus 400. As shown, the apparatus 400 may include a processor 410, a memory 420 that stores a program, and optionally a communication interface 430 for communicating data with other external devices through wired and/or wireless communication.

The program includes program instructions that, when executed by the processor 410, enable the apparatus 400 to operate in accordance with the embodiments of the present disclosure, as discussed above. That is, the embodiments of the present disclosure may be implemented at least in part by computer software executable by the processor 410, or by hardware, or by a combination of software and hardware.

The memory 420 may be of any type suitable to the local technical environment and may be implemented using any suitable data storage technology, such as semiconductor based memory devices, flash memories, magnetic memory devices and systems, optical memory devices and systems, fixed memories and removable memories. The processor 410 may be of any type suitable to the local technical environment, and may include one or more of general purpose computers, special purpose computers, microprocessors, digital signal processors (DSPs) and processors based on multi-core processor architectures, as non-limiting examples.

Figure 5:
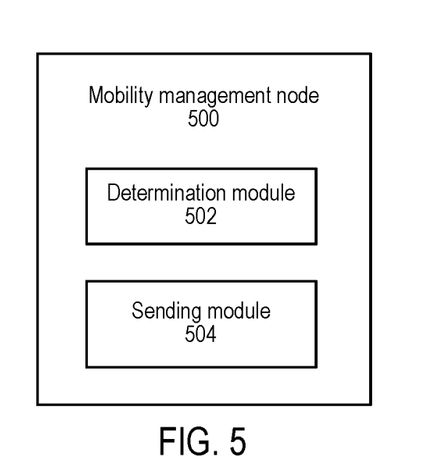
FIG. 5 is a block diagram showing a mobility management node according to an embodiment of the disclosure.

FIG. 5 is a block diagram showing a mobility management node according to an embodiment of the disclosure. As shown, the mobility management node 500 comprises a determination module 502 and a sending module 504. The determination module 502 may be configured to determine to establish a connection between the mobility management node and a terminal device for which location reporting is required, as described above with respect to block 102. The sending module 504 may be configured to send, to a base station, a request for establishing the connection, as described above with respect to block 104. The request is configured to request the base station to report location information of the terminal device.

Figure 6:
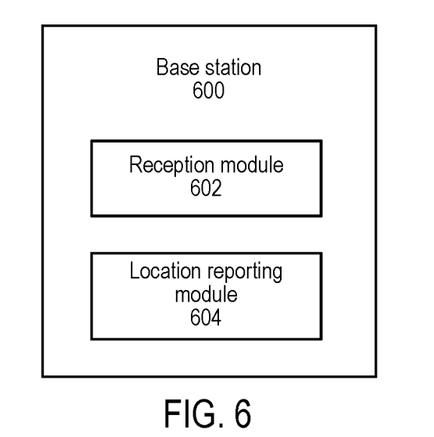
FIG. 6 is a block diagram showing a base station according to an embodiment of the disclosure.

FIG. 6 is a block diagram showing a base station according to an embodiment of the disclosure. As shown, the base station 600 comprises a reception module 602 and a location reporting module 604. The reception module 602 may be configured to receive, from a mobility management node, a request for establishing a connection between the mobility management node and a terminal device, as described above with respect to block 202. The request is configured to request the base station to report location information of the terminal device. The location reporting module 604 may be configured to report, according to the request, the location information of the terminal device to the mobility management node, as described above with respect to block 204. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method implemented at a mobility management node, the method comprising:
   determining to establish a connection between the mobility management node and a terminal device for which location reporting is required; and
   sending, to a base station, a request for establishing the connection in an INITIAL CONTEXT SETUP REQUEST message, wherein the request is configured to request the base station to report location information of the terminal device by including an information element (IE) for requesting location reporting, in which the IE is a Location Reporting Request Type IE that indicates a type of the requested location reporting, and wherein the type of the requested location reporting is one of:
   to report that the terminal device is moving into an area of interest;
   to report that the terminal device is moving out of an area of interest; or
   to report a location of the terminal device.

2. The method according to claim 1, wherein the determining to establish the connection comprises any one of:
   determining that the terminal device is performing registration update procedure or service request procedure;
   determining that the mobility management node is performing service request procedure for the terminal device; or
   determining that a network function (NF) has subscribed to mobility event notification from the mobility management node for the terminal device.

3. The method according to claim 2, wherein the determining that the NF has subscribed to mobility event notification from the mobility management node for the terminal device comprises:
   determining the terminal device is to transit from connection management idle (CM-IDLE) state to connection management connected (CM-CONNECTED) state.

4. The method according to claim 1, wherein the mobility management node is an access and mobility management function (AMF).

5. A method implemented at a base station, the method comprising:
   receiving, from a mobility management node, a request for establishing a user equipment context as part of establishment of a connection between the mobility management node and a terminal device in an INITIAL CONTEXT SETUP REQUEST message, wherein the request is configured to request the base station to report location information of the terminal device by including an information element (IE) for requesting location reporting, in which the IE is a Location Reporting Request Type IE that indicates a type of the requested location reporting, and wherein the type of the requested location reporting is one of:
   to report that the terminal device is moving into an area of interest;
   to report that the terminal device is moving out of an area of interest; or
   to report a location of the terminal device; and
   reporting, according to the request, the location information of the terminal device to the mobility management node according to the indicated type.

6. The method according to claim 5, wherein the received request for establishing the connection accompanies any one of:
   the terminal device performing registration update procedure or service request procedure;
   the mobility management node performing service request procedure for the terminal device; or
   a transition of the terminal device from connection management idle (CM-IDLE) state to connection management connected (CM-CONNECTED) state.

7. The method according to claim 5, wherein the mobility management node is an access and mobility management function (AMF).

8. A mobility management node comprising:
   at least one processor; and
   at least one memory, the at least one memory containing instructions which, when executed by the at least one processor, cause the mobility management node to:
      determine to establish a connection between the mobility management node and a terminal device for which location reporting is required; and
      send, to a base station, a request for establishing the connection in an INITIAL CONTEXT SETUP REQUEST message, wherein the request is configured to request the base station to report location information of the terminal device by including an information element (IE) for requesting location reporting, in which the IE is a Location Reporting Request Type IE that indicates a type of the requested location reporting, and wherein the type of the requested location reporting is one of:
         to report that the terminal device is moving into an area of interest;
         to report that the terminal device is moving out of an area of interest; or
         to report a location of the terminal device.

9. The mobility management node according to claim 8, wherein to determine to establish the connection comprises operations to any one of:
   determine that the terminal device is performing registration update procedure or service request procedure;
   determine that the mobility management node is performing service request procedure for the terminal device; or
   determine that a network function (NF) has subscribed to mobility event notification from the mobility management node for the terminal device.

10. The mobility management node according to claim 8, wherein the mobility management node is an access and mobility management function (AMF).

11. A base station comprising:
   at least one processor; and
   at least one memory, the at least one memory containing instructions which, when executed by the at least one processor, cause the base station to:
      receive, from a mobility management node, a request for establishing a user equipment context as part of establishment of a connection between the mobility management node and a terminal device in an INITIAL CONTEXT SETUP REQUEST message, wherein the request is configured to request the base station to report location information of the terminal device by including an information element (IE) for requesting location reporting, in which the IE is a Location Reporting Request Type IE that indicates a type of the requested location reporting, and wherein the type of the requested location reporting is one of:
         to report that the terminal device is moving into an area of interest;
         to report that the terminal device is moving out of an area of interest; or
         to report a location of the terminal device; and
      reporting, according to the request, the location information of the terminal device to the mobility management node according to the indicated type.

* * * * *

UNITED STATES PATENT AND TRADEMARK OFFICE
CERTIFICATE OF CORRECTION

PATENT NO. : 12,238,676 B2  
APPLICATION NO. : 18/069236  
DATED : February 25, 2025  
INVENTOR(S) : Ren et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 7, delete "KR 20150035288 A)" and insert -- (KR 20150035288 A) --, therefor.

On Page 2, in Item (56), under "OTHER PUBLICATIONS", in Column 2, Line 7, delete "Sevice" and insert -- Service --, therefor.

On Page 2, in Item (56), under "OTHER PUBLICATIONS", in Column 2, Line 8, delete "Funtion" and insert -- Function --, therefor.

On Page 2, in Item (56), under "OTHER PUBLICATIONS", in Column 2, Line 9, delete "WO 2015161575 A1)" and insert -- (WO 2015161575 A1) --, therefor.

In the Specification

In Column 1, Line 8, delete "2021," and insert -- 2021, now U.S. Pat. No. 11,540,247, --, therefor.

In Column 1, Line 46, delete "objects" and insert -- objectives --, therefor.

In Column 5, Line 24, delete "CM_IDLE" and insert -- CM-IDLE --, therefor.

In Column 5, Line 25, delete "CM_CONNECTED)," and insert -- CM-CONNECTED), --, therefor.

Signed and Sealed this  
Fourteenth Day of October, 2025

John A. Squires  
*Director of the United States Patent and Trademark Office*